3,093,589
MAGNETIC MATERIAL

Charles D. Downs, Newtown, Pa., and John Martin, Hamilton Square, N.J., assignors to Columbian Carbon Company, New York, N.Y., a corporation of Delaware
No Drawing. Filed May 11, 1961, Ser. No. 109,268
10 Claims. (Cl. 252—62.5)

This invention relates to improved barium ferrite compositions having novel characteristics, by reason of which they are especially useful in the making of permanent magnets. They are also valuable for use as pigment.

It has previously been proposed to use barium ferrite of hexagonal crystalline structure, and of the composition $BaO.6Fe_2O_3$, in the manufacture of permanent magnets. Magnets so produced have been found to have extraordinarily high coercive force, to have exceedingly high electrical resistivity and to be very resistant to demagnetization.

However, in making permanent magnets from such previously available barium ferrite, it has been found necessary to subject the ferrite particles to a strong magnetic field while they are in a mobile state, and before compression of the particle into hard immobile forms, in order to effect an orientation of the ferrite particles. Where they are not fabricated in a magnetic field, it has been found that the energy product of the resultant magnets, i.e., the value $(BH)_{max}F$, does not exceed $1.1 \times 10^6$ gauss-oersteds/cm.$^3$.

It is an object of our present invention to produce a barium ferrite of improved magnetic characteristics, particularly with respect to the energy product of magnets produced therefrom, while retaining the desirable characteristics with respect to coercive force, electrical resistivity, resistance to demagnetization, and the like. A further object is to produce a barium ferrite adapted to the production of permanent magnets of high energy product and having the other desirable characteristics, just noted, without the necessity of subjecting the ferrite to a magnetic field, either before or during molding, to effect particle orientation.

These and other objects are attained by the present invention which provides improved barium ferrite, and an improved process for producing barium ferrites, having those desired properties.

It has previously been proposed to produce barium ferrite by heating an intimate mixture of barium oxide or barium carbonate and ordinary red iron oxide. In accordance with the present invention, we use as the ferric oxide constituent a synthetic, acicular ferric oxide, such as hereinafter more fully described, either in the form of a precipitated yellow ferric oxide monohydrate, $Fe_2O_3.H_2O$, or such monohydrate which has been dehydrated or dehydrated and especially treated to remove residual sulfur therefrom, but retaining acicular characteristics.

It is essential that the ferric oxide used in our process be of acicular particle shape, as distinguished from such ferric compounds having spheroidal or cubical structures. The monohydrate should be of the orthorhombic goethite structure, such as is produced, for instance, by precipitation and oxidation of ferrous hydroxide at low temperature, to form a very finely divided seed material, which is then grown in the presence of metallic iron to the required particle size. The oxide used, in accordance with the present invention, should be of small particle size, most advantageously having an average length of 0.5–2.5 microns and an average diameter of 0.1–0.5 micron, the average ratio of length to diameter advantageously being in the range from 2:1 to 5:1. Ordinary finely divided commercial barium carbonate may be used as the barium compound.

A yellow ferric oxide hydrate which has been used with particular advantage in our present process was one prepared by first precipitating very small acicular-shaped seed crystals by air-blowing a mixture of an aqueous ferrous salt solution and an aqueous alkali solution at a temperature of about 75° F. and thereafter growing the seed crystals to the specified particle size by continued air-blowing at a temperature of 145° to 155° F. in the presence of scrap iron, as generally described in Patent No. 1,368,748 to Penniman and Zoph. The yellow ferric oxide thus obtained is then separated from the suspension by filtration and washed free of salts.

Especially satisfactory results have been obtained by using as the ferric oxide starting material an alpha ferric oxide hydrate produced in accordance with the process described and claimed in Patent 2,939,767, whereby a free oxygen-containing gas, for instance air, is passed in intimate contact with a ferrous salt solution while maintaining the pH of the solution within the range of about 2.5 to 5 by passing anhydrous ammonia into the solution in admixture with the air and maintaining the temperature of the solution within the range from about 125° to about 200° F. The ferric oxide hydrate so produced is of the required crystalline and particle structure and is of unusual purity and appears to possess other characteristics which, in some way, influence the magnetic properties of the barium ferrite produced therefrom in accordance with our present process.

In carrying out our present process, the selected finely divided ferric oxide, in carefully regulated proportion, is intimately and uniformly mixed, preferably in aqueous slurry, with the finely divided barium carbonate, the resultant mixed slurry is dewatered, a chloride catalyst, as hereinafter more fully described, is uniformly dispersed in the resultant dewatered mass and the mixture then dried at moderate temperature, preferably about 210°–260° F. The dried mixture is then calcined at a temperature within the range of about 1600°–1800° F. for a period of 10–30 minutes. The calcined mass is then cooled and ground to a powder.

In order to obtain a barium ferrite having the improved energy product characteristic, we have found it necessary that in preparing the composite slurry the specified ferric oxide and the barium carbonate be mixed in proportions equivalent to a $Fe_2O_3.BaO$ ratio within the range 5.9–6.4:1 and more advantageously within the range 6.1–6.2:1. It presently appears that a slight excess of $Fe_2O_3$ over a 6:1 ratio introduces certain strains in the resultant barium ferrite structure the presence of which enhances its ferro-magnetic properties.

Though we presently prefer to effect the mixing of the ferric oxide and barium carbonate in aqueous slurry, as just described, satisfactory results may also be obtained by known methods of dry-mixing finely divided materials adapted to effect thorough, uniform mixing, e.g., grinding or milling. Where dry-mixing is used, suitable precautions should be taken to assure the presence of the respective materials in the prescribed proportions. Where dry-mixing is used, the chloride catalyst may also be added in dry form or may be added in aqueous solution to the dry mixture and uniformly dispersed therein.

In manufacturing barium ferrite magnets, the barium ferrite powder, produced as just described, may be compressed in a mold of the desired shape, without being subjected to a magnet field to effect particle orientation, and refired to produce a hard, metal-like piece.

One of the problems encountered in the manufacture of ferrite magnets has been the growth, during the refiring operation, of undesirable large crystals having poor magnetic properties. We have found that this crystal growth begins during the initial calcination to form the ferrite and that the enlarged crystals continue to grow during the refiring step, thus losing their desired magnetic properties, and that by inhibiting crystal growth in the initial calcination step of the process subsequent crystal growth is retarded.

We have found that this crystal growth may be greatly inhibited by carrying out the initial calcining step, to form the ferrite, in the presence of a chloride catalyst, as just noted, which is volatile at the calcining temperature.

As the chloride catalyst, we have, with particular advantage, used barium chloride in a proportion of approximately ½ percent, e.g., about 0.4–0.6% barium chloride on the weight of the dry solids. However, proportions as low as 0.1% have been found to be effective. Also, with marked advantage, we have used catalytic proportions of ferrous chloride, ferric chloride and hydrogen chloride, respectively. However, the use of ferric chloride for this purpose is not generally recommended because of its corrosive properties.

The use of the chlorides just mentioned has the advantage of avoiding possible dilution or contamination of the resultant barium ferrite with ions of other metals, which for some purposes may be objectionable. However, the proportion of chloride required to promote the desired reaction is so small as to have no significant diluting or contaminating effect on the ferrite product.

In other respects, the proportion and identity of the particular chloride used is not critical, except that we have found that proportions of the chloride less than the chemical equivalent of about 0.1% barium chloride have a commercially insignificant or negligible catalytic effect.

We have obtained highly beneficial results using proportions of barium chloride of 0.2%, and especially satisfactory results have been obtained using 0.5% $BaCl_2$ on the weight of the dry solids, calcining at about 1650° F. for 30 minutes. Equivalent proportions of other metal chlorides, or of hydrogen chloride, are also highly effective in promoting the reaction.

Reference herein and in the appended claims to the chemical equivalent of barium chloride will be understood to be based on chlorine content of the respective chlorides.

While larger proportions of the chloride catalyst may be used effectively, we have found it generally undesirable to use proportions in excess of about 1% of barium chloride, or its equivalent, since no noticeable further improvement in the magnetic properties of the resultant barium ferrite is obtained and objectionable dilution of the desired product may result, especially where a chloride of a metal other than iron or barium is used. Further, where the particular chloride used is of relatively low melting point, an excessive proportion of the chloride, e.g., in excess of about 1%, may result in mass fusion of the material during the calcining operation, which is distinctly undesirable.

All of the metal chlorides are volatile within the range of the herein prescribed calcining temperature and all are effective as catalyst, when used in the above-indicated proportions, in promoting the desired reaction. In addition to the chlorides previously mentioned herein, one may, for instance, use ammonium chloride, zinc chloride or any of the chlorides of the alkali metals or alkaline earth metals, due consideration being given to cost and corrosive properties and also the calcining temperature employed in the specific operation. The chloride catalyst is with advantage added to the mixed reactants as an aqueous solution or suspension following the dewatering step. The composite mixture is then with advantage extruded in the form of small rods or pellets, approximately one inch long by one-quarter inch in diameter, prior to the drying step.

In accordance with this procedure, we have produced barium ferrite capable of producing magnets having a $(BH)_{max}$ characteristic somewhat in excess of $1.4 \times 10^6$ gauss-oersteds/cm.$^3$, without the customary subjection of the ferrite particles to a magnetic field during fabrication of the magnet to effect particle orientation.

The process of the invention will be illustrated by the following specific examples:

*Example I*

2,000 pounds of ferric oxide hydrate, $Fe_2O_3.H_2O$, of the type previously described, was thoroughly mixed with water to form a slurry containing about 15% solids by weight. This slurry, after mixing, was passed through a fine screen to insure complete dispersion of the solids and freedom from aggregates. A second slurry was prepared, as just described, containing 415 pounds of finely divided barium carbonate. These two slurries were then combined and thoroughly mixed by agitation for several hours to form a homogeneous slurry. A small sample of the resultant slurry was then withdrawn and analyzed for $Fe_2O_3$ and $BaCO_3$, in order to insure that the two reactants were present in the prescribed proportions.

Since these proportions should be controlled to an accuracy of plus or minus 0.1%, which is barely within the accuracy of ordinary chemical analysis, it is usually desirable to analyze several samples of the composite slurry as a check. The proportions of the two reactants are then adjusted by the addition of the iron oxide or barium carbonate, according to the results of these analyses, to bring the ratio to the required value.

After the proportion of ferric oxide and barium carbonate had been carefully checked and accurately adjusted, the slurry was then dewatered by filtration and uniformly wetted with an aqueous solution of barium chloride containing 0.6% of barium chloride, on the weight of the dry solids. The resultant solid was then extruded in the form of small rods about one inch long and about one-quarter inch in diameter and these rods were dried at a temperature of about 100° C.

The dried pellets were then fed into a gas-fired rotary furnace heated to a temperature of 1750° F. and thus heated for a period of about 20 minutes. The calcined pellets were then cooled and ground to a fine powder in a grinding mill.

This operation was repeated three times under substantially identical conditions and in each instance, the resultant barium ferrite was formed into permanent magnets by conventional procedure, except that orientation of the particles by subjecting them, while in a mobile state, to a magnetic field for effecting particle orientation was omitted. The energy product values of the resultant magnets, i.e., $(BH)_{max}F$, was found to be 1.30, 1.42 and $1.40 \times 10^6$ gauss-oersteds/cm.$^3$.

The resultant product was a soft dark red powder having the following analysis, the proportions being by weight:

| | |
|---|---|
| $Fe_2O_3$ | percent__ 81.50 |
| BaO | do____ 13.00 |
| $BaSO_4$ | do____ 5.00 |
| Water-soluble salts | do____ 0.25 |
| Ignition loss | None |
| Specific gravity | 5.12 |

An X-ray diffraction analysis showed the product to be hexagonal with a magnetoplumbite structure and to contain only a trace of unreacted barium oxide. The particles were shown by electron microscope examination to be somewhat elongated in shape.

The foregoing operation was repeated substituting respectively for the barium chloride catalyst an equivalent proportion of ferrous chloride and magnesium chloride with substantially identical results.

Using the identical proportions and operating conditions on a reduced scale in laboratory apparatus, the foregoing operation was repeated substituting for the barium chloride an equivalent proportion of hydrogen chloride, ferric chloride and calcium chloride, respectively. In each instance, results substantially identical with those just described were obtained.

The ferric oxide hydrate, prepared as previously noted herein, has usually been found to contain considerable adsorbed sulfate. When used in accordance with the present invention, the sulfate present appears to combine with the barium carbonate to form barium sulfate. Therefore, the barium ferrite, prepared as described above, has usually been found to contain from 3.00%–6.0% barium sulfate by weight. Its effect on the quality of the barium ferrite appears to be that of a diluent but has no deleterious effect on magnetic properties.

Where it is desired to reduce this diluent effect, the sulfate may be largely removed from the ferric oxide prior to reacting it with the barium oxide. This may be accomplished as follows: The ferric oxide hydrate is subjected to calcination at a temperature of about 1200° F. for about 10 minutes. During this calcination a large portion of the adsorbed sulfate is desorbed and may thereafter be washed out of the ferric oxide by water washing. Also, by this procedure, the hydrate is dehydrated to $Fe_2O_3$, but the characteristic acicular particle shape and size of the hydrate have been found to persist.

Operation, in accordance with the present invention, in which the ferric oxide hydrate is first subjected to the preliminary step for removing adsorbed sulfur, is illustrated by the following example:

Example II

A ferric oxide hydrate, such as used in Example I, was heated in a rotary furnace at a temperature of 1200° F. for about 10 minutes and the resultant ferric oxide was washed with water. The washed ferric oxide was then dried and ground and made into an aqueous slurry. This slurry was filtered, washed and repulped with more water to form a slurry containing 15–20% solids, by weight, as described in Example I. An appropriate volume of the slurry was then measured out and mixed with a preformed aqueous slurry of barium carbonate in proportions such that the ratio of $Fe_2O_3$:BaO in the composite slurry was within the range of 6.0–6.2:1. This ratio was checked and rechecked and adjusted to the value just given.

The composite slurry was then dewatered by filtration, rewashed, again dewatered and treated with an aqueous solution of barium chloride sufficient to leave 0.5% barium chloride on the solids.

The resultant filter cake was then extruded, as in Example I, and the rods dried at about 260° F. The rods were then fed into a gas-fired rotary furnace maintained at a temperature of 1750° F. and were thus calcined for about 15–20 minutes, until an analysis showed substantially complete reaction between the BaO and $Fe_2O_3$. The calcined material was then cooled and ground as previously described. The resultant product was found to have the following analysis, by weight:

|  | Percent |
| --- | --- |
| $Fe_2O_3$ | 85.5 |
| BaO | 13.5 |
| $BaSO_4$ | 0.6 |

Permanent magnets produced from the ferrite resulting from the foregoing specific example, without subjecting the particles while in a mobile state to the influence of a magnetic field to effect particle orientation, were found to have the previously described magnetic properties, with $(BH)_{max}$ characteristics at least as high as $1.4 \times 10^6$ gauss-oersteds/cm.$^3$.

The crystals of barium ferrite resulting from our process are hexagonal, of a magnetoplumbite structure, and the particle shape tends to be somewhat elongated with irregular shaped platelets with straight edges dominating. These particles, as previously noted, have the property of self-orientation.

This application is in part a continuation of our copending application Ser. No. 612,070, filed September 25, 1956, now abandoned.

We claim:

1. Process for producing an improved barium ferrite especially adapted to use in the making permanent magnets which comprises calcining at a temperature of 1600°–1800° F. for from 10 to 30 minutes an intimate uniform mixture of finely divided barium carbonate and a finely divided ferric oxide having an acicular structure, in proportions within the range equivalent to one mol BaO to 5.9–6.4 mols $Fe_2O_3$ and a catalytic amount of a chloride catalyst, which is volatile at the calcining temperature equivalent to not less than about 0.1% nor more than about 1% of barium chloride on the weight of the solids, the particles of the ferric oxide used having an average length of 0.5–2.5 microns and an average diameter of 0.1–0.5 micron, the average ratio of length to diameter being within the range from about 2:1 to about 5:1.

2. The process of claim 1 in which the mixture is calcined at a temperature of about 1650° F. for a period of about 30 minutes.

3. The process for producing an improved barium ferrite especially adapted to use in the making of permanent magnets which comprises intimately and uniformly mixing, in aqueous slurry, finely divided barium carbonate and a finely divided ferric oxide having an acicular structure, in proportions within the range equivalent to one mol BaO to 5.9–6.4 mols $Fe_2O_3$, dewatering the slurry, uniformly dispersing in the resultant mixture a catalytic amount of a chloride catalyst, which is volatile at the calcining temperature equivalent to not less than about 0.1% nor more than about 1% of barium chloride on the weight of the solids, drying the mixture at moderate temperature and calcining the resultant dry mixture at a temperature of 1600°–1800° F. for from 10 to 30 minutes, the particles of the ferric oxide used having an average length of 0.5–2.5 microns and an average diameter of 0.1–0.5 micron, the average ratio of length to diameter being within the range from about 2:1 to about 5:1.

4. The process of claim 1 in which the proportion of chloride catalyst is equivalent to about ½% of barium chloride on the weight of the dry solids.

5. The process of claim 1 in which the chloride catalyst is barium chloride.

6. The process of claim 1 in which the chloride catalyst is ferrous chloride.

7. Process for producing an improved barium ferrite especially adapted to use in the making of permanent magnets and relatively free from sulfate, which comprises calcining an acicular ferric oxide monohydrate of orthorhombic goethite structure and containing adsorbed sulfate, without destroying its acicular structure, to desorb the sulfate, washing the resultant ferric oxide with water until the desorbed sulfate has been substantially removed, intimately and uniformly mixing the washed ferric oxide, in aqueous slurry, with finely divided barium carbonate in proportions within the range equivalent to one mol BaO to 5.9–6.4 mols $Fe_2O_3$, dewatering the slurry, uniformly dispersing in the resultant mixture a catalytic amount of a chloride catalyst, which is volatile at the calcining temperature equivalent to not less than about 0.1% nor more than about 1% of barium chloride on the weight of the solids, drying the mixture at moderate temperature and calcining the resultant dry mixture at a temperature of 1600°–1800° F. for 10 to 30 minutes, the particles of the ferric oxide used having an average length of 0.5–2.5 microns and an average diameter of 0.1–0.5 micron, the average ratio of length to diameter being within the range from about 2:1 to about 5:1.

8. The process of claim 1 in which the ratio of $Fe_2O_3$ to barium carbonate is equivalent to a $Fe_2O_3$:BaO ratio within the range of 6.1:1 to 6.2:1.

9. The process of claim 1 in which the chloride catalyst is hydrogen chloride.

10. Barium ferrite having improved magnetic characteristics and especially adapted to use in the making of permanent magnets produced by calcining at a temperature of 1600°–1800° F. for a period from 10 to 30 minutes an intimate uniform mixture of finely divided barium carbonate and a finely divided ferric oxide having an acicular structure, in proportions within the range equivalent to one mol BaO to 5.9–6.4 mols $Fe_2O_3$ and a catalytic amount of a chloride catalyst, which will decompose at the calcining temperature with liberation of chlorine equivalent to not less than 0.1% nor more than about 1% of barium chloride on the weight of the solids, the particles of ferric oxide used having an average length of 0.5–2.5 microns and an average diameter of 0.1–0.5 micron, the average ratio of length to diameter being within the range from about 2:1 to 5:1.

References Cited in the file of this patent

UNITED STATES PATENTS

| | | |
|---|---|---|
| 2,694,656 | Camras | Nov. 16, 1954 |
| 2,762,777 | Went et al. | Sept. 11, 1956 |
| 2,837,483 | Hakker et al. | June 3, 1958 |
| 2,854,412 | Brockman et al. | Sept. 30, 1958 |

FOREIGN PATENTS

| | | |
|---|---|---|
| 793,870 | Great Britain | Apr. 23, 1958 |